United States Patent

Murray et al.

[15] 3,700,909

[45] Oct. 24, 1972

[54] METHOD FOR DETECTING PINHOLE DEFECTS IN FOIL MATERIAL

[72] Inventors: Russell Murray, Laurel, Md.; Dominique Gignoux, Washington, D.C.

[73] Assignee: Columbia Research Corporation, Gaithersburg, Md.

[22] Filed: March 9, 1972

[21] Appl. No.: 233,239

[52] U.S. Cl. ........... 250/219 DF, 250/214 R, 356/237
[51] Int. Cl. .............................................. G01n 21/32
[58] Field of Search .... 250/219 DF, 205, 217 R, 83.3 UV, 250/214 R; 356/237, 238, 200

[56] References Cited

UNITED STATES PATENTS

| 2,892,951 | 6/1959 | Linderman | 250/219 X DF |
| 2,939,016 | 5/1960 | Cannon | 250/219 DF |
| 3,058,004 | 10/1962 | Domizi et al. | 250/219 DF |
| 3,612,702 | 10/1971 | Troll | 356/200 |
| 3,619,578 | 11/1971 | George | 356/237 X |

*Primary Examiner*—Walter Stolwein
*Attorney*—David H. Semmes

[57] ABSTRACT

A system for detecting the number of pinhole defects in any given segment of advancing foil material. Particularly a narrow width ultra-violet light source and corresponding ultra-violet and photomultiplier unit, as well as associated circuitry for shaping and counting electrical pulses, corresponding to the diameter of the pinhole defects. The system distinguishes from the prior art in that it makes possible the detection of holes in a material having a large density of holes as well as discriminating as to the number of given defects in several different sizes or threshold categories.

8 Claims, 4 Drawing Figures

METHOD FOR DETECTING PINHOLE DEFECTS IN FOIL MATERIAL

BACKGROUND OF THE INVENTION

1. Field of the Invention

This invention relates to apparatus for detecting faults in sheet materials and is particularly directed to apparatus for counting and classifying these defects, for example so-called "pinholes," cracks or tears in a running length of metallic or other material, such as aluminum foil.

According to the invention apparatus for detecting defects in sheet material comprises means for photoelectrically generating a signal when light is able to pass through a defect in said material, means for detecting said signal and means for counting and analyzing said signal to determine the characteristics.

SUMMARY OF THE INVENTION

System for detecting pinhole defects in foil material, particularly a narrow width ultra-violet light source positioned above a lineal segment of advancing foil material and a corresponding ultra-violet filter and photosensitive unit consisting, for instance, for photomultipliers positioned beneath the light source, such that ultra-violet light transformed through pinhole defects will be photomultiplied, amplified, and measured. The system is characterized in its collimating of the ultra-violet source, vertical shielding of the photomultiplier, and diverting of electrical signals to dynode voltage shutdown circuitry, so as to avoid damage to the photomultiplier element. The photomultiplier tube output is generated as electrical pulses, the height of which are measured as a function of pinhole diameter. Signals directed through the various thresholds corresponding to pinhole diameter are accumulated or counted, so that the number of pinhole defects of a given size in any lineal segment may be determined.

DESCRIPTION OF THE PREFERRED EMBODIMENTS

Figure 1:
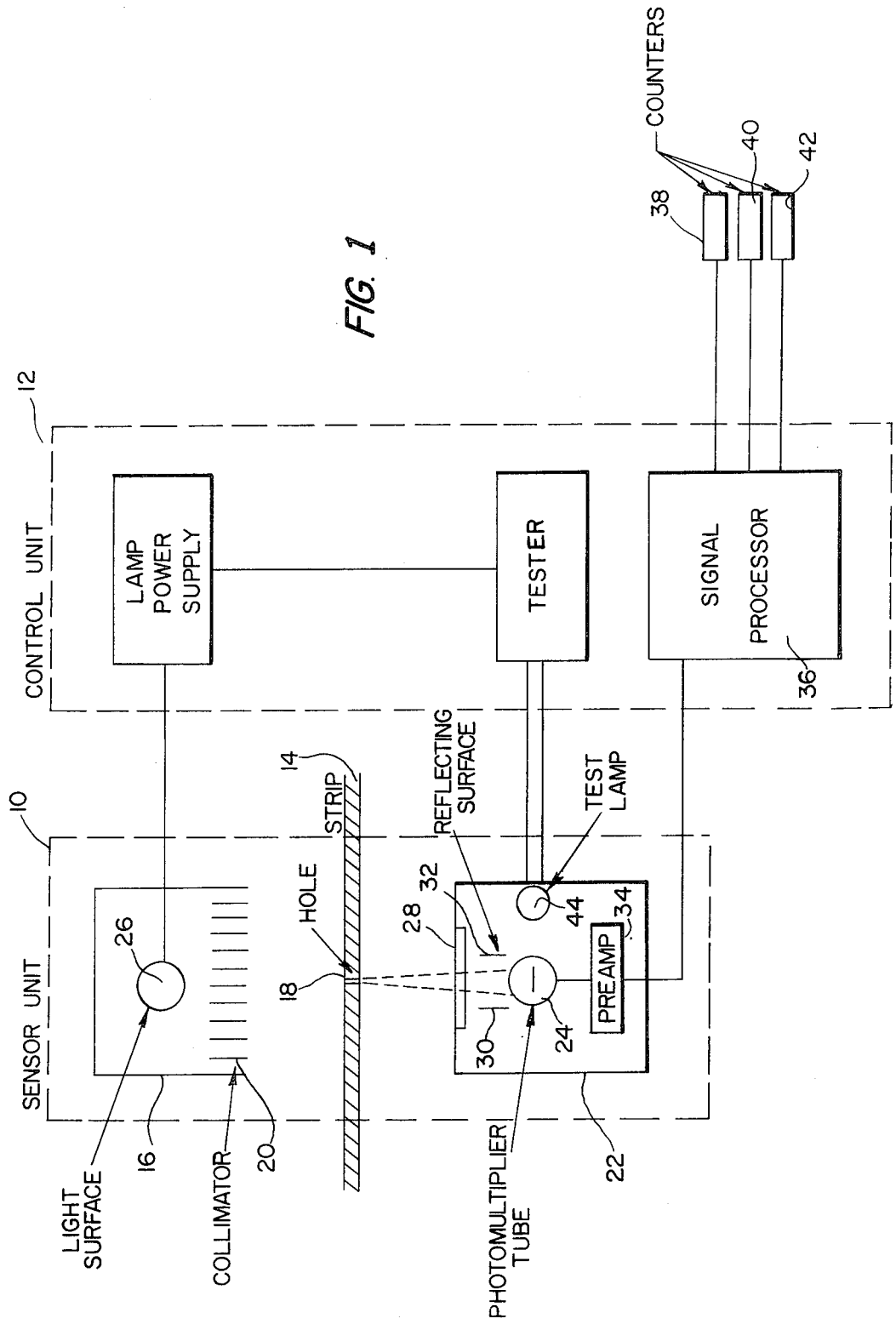
FIG. 1 is a schematic view of the proposed ultra-violet light, sensory unit and control units utilized according to the present diagram.

The apparatus preferably includes a sensor unit 10 and a control unit 12 and the apparatus is particularly suitable for use in monitoring moving lengths of material 14 during production. A light housing 16 is placed on one side of the material, for example above it, and light projected on to the material will pass through collimators 20 and through defects 18 such as pinholes, cracks or tears into a scanner unit 22 embodying photomultiplier tube 24 and test lamp 44. Either the whole width of material 14 may be monitored, or a smaller lineal segment of the width is scanned as a sample which is taken to be representative of the whole.

The light source 26 is preferably ultra-violet, although other parts of the spectrum may be used if desired; it is particularly advantageous to modulate the light source above the frequency of the ambient light and line power.

Beams of light passing through the material generate signals in photomultiplier tubes 24, each signal having a frequency which depends on the modulation frequency of the light and an amplitude proportional to the amount of light passing through the material.

A light source 16 is placed above the strip 14 which shines light down through any pinholes 18 in the sheet (cracks, tears, etc. are also detected) as shown in FIG. 1. The light which passes through the pinhole 18 enters an otherwise sealed scanner box 22 through a viewing window 28. The window 28 is made of a material which passes, with little attenuation, the light from the source above the strip, but rejects light of other spectra to reduce the effect of ambient light on pinhole detection. The light is preferably ultra-violet although light in a different part of the spectrum may also be employed. The light shines on a photomultiplier tube 24 and generates a signal whose frequency is dependent on the frequency of modulation of the light source, and whose amplitude is proportional to the amount of light passed through the pinhole. The frequency of the light source 26 will be preferably at a frequency which yields an 8 KHz signal; however, any frequency of modulation from zero for direct current, up to the limit of the response of the lamp could be used. Advantageously the modulated frequency of the lamp source is far removed from those frequencies of ambient light and line power generally found in the surroundings (DC to 400 Hz). The amplitude of the signal is a function of the cross-sectional area of hole 18 normal to the path of the light from the source and the response of the area of the photomultiplier tube's photosensitive cathode upon which the light falls. Reflective surfaces or lenses 30 and 32 strategically placed inside the scanner box will tend to compensate for detrimental effects so that the amplitude of the output signal from the photomultiplier is therefore related to the size of the pinhole. The signal is then amplified in a preamplifier 34 in the scanner box and supplied to the Signal Processor 36 in the Control Unit 12. The function of the Signal Processor is to provide separate output lines for different size pinholes. This is accomplished by changing the signal to a pulse form while maintaining its amplitude information and then feeding this pulse into a pulse height analyzer of the appropriate type. The pulse height analyzer can be designed either to give outputs on each line for (a) the number of pinholes greater than a given size, or (b) the number of pinholes in a given size range. These two methods are shown respectively in FIGS. 3 and 4.

The outputs of the Signal Processor 36 can then be fed into separate counters 38, 40 and 42 to store the desired data. The number of output lines and counters required is based upon the number of pinhole size discriminations desired within the active region of the system. If desired, the information logged in the counters can be printed out to provide a permanent record.

Figure 2:
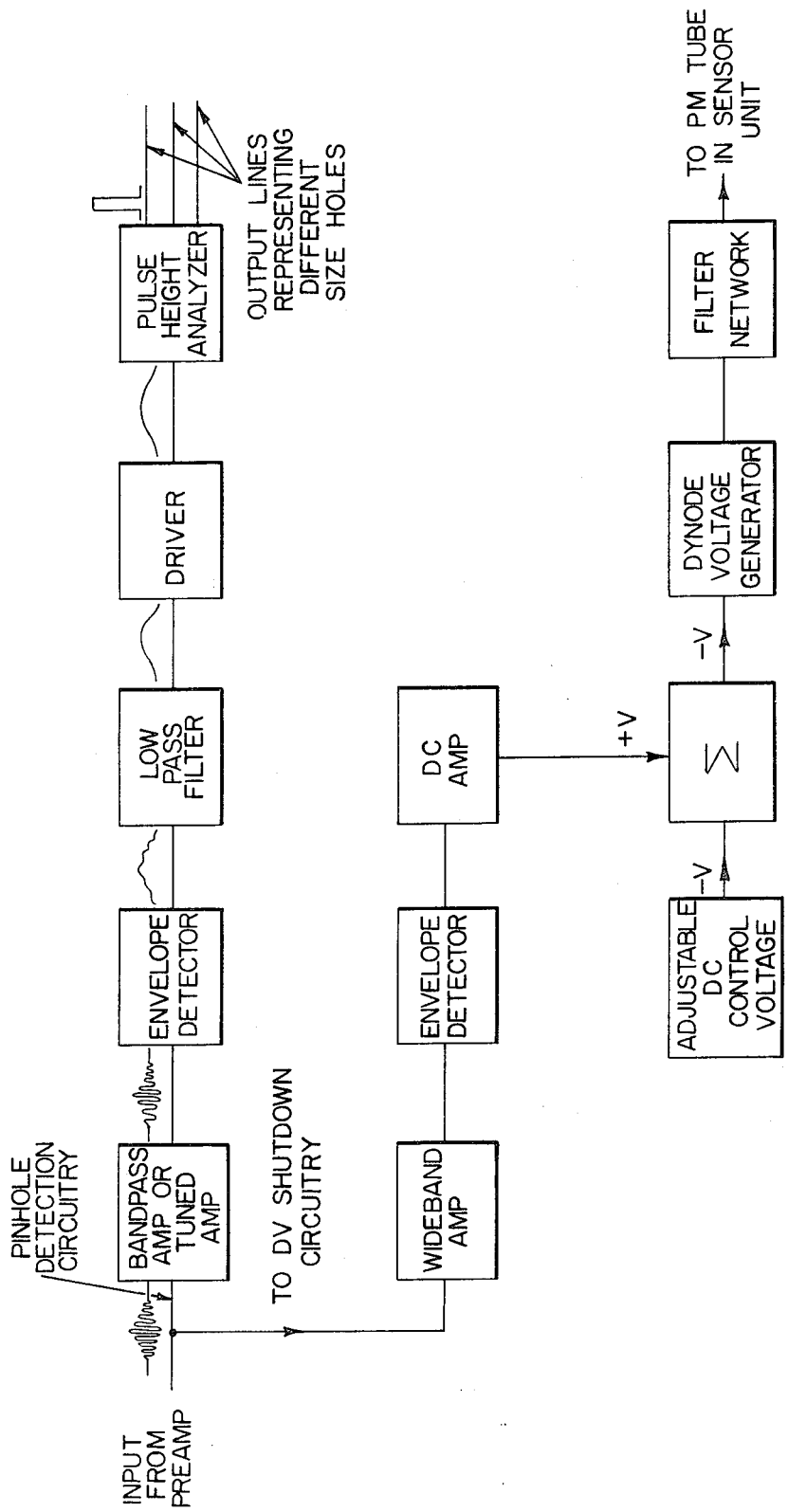
FIG. 2 is a schematic view of the signal processing unit.

As illustrated in FIG. 2, at the input to the Signal Processor 36, the pinhole signal has been detected by the photomultiplier, amplified and fed to the Control Unit as a burst of 8 KHz in the presence of "white noise." This signal is fed into both the pinhole detection circuitry and the dynode voltage (DV) control circuitry. The latter's purpose is to reduce the dynode voltage in the event of a large hole or in case the sheet 14 is removed from over the detector window and thereby prevent large amounts of light from damaging the photomultiplier tubes. In the detection circuitry, the electronic signal is passed through a bandpass amplifier to prevent ambient light or pickup from stray electronic signals from passing through the detection system and being recorded as a false pinhole. The output of the bandpass filter is a burst of 8 KHz which is passed to the envelope detector to obtain a monopolar pulse which will be more usable in the pulse height analyzer circuitry. The waveform is then sent to a low pass filter. This filter smooths out any high frequency variation in the waveform to provide a smooth peak. In addition, any high frequency noise which may have passed through the bandpass filter, even in very small amplitude, is greatly reduced due to the action of the low pass filter. Once through the low pass filter, the signal is then fed through a driver and into a pulse height analyzer.

Figure 3:
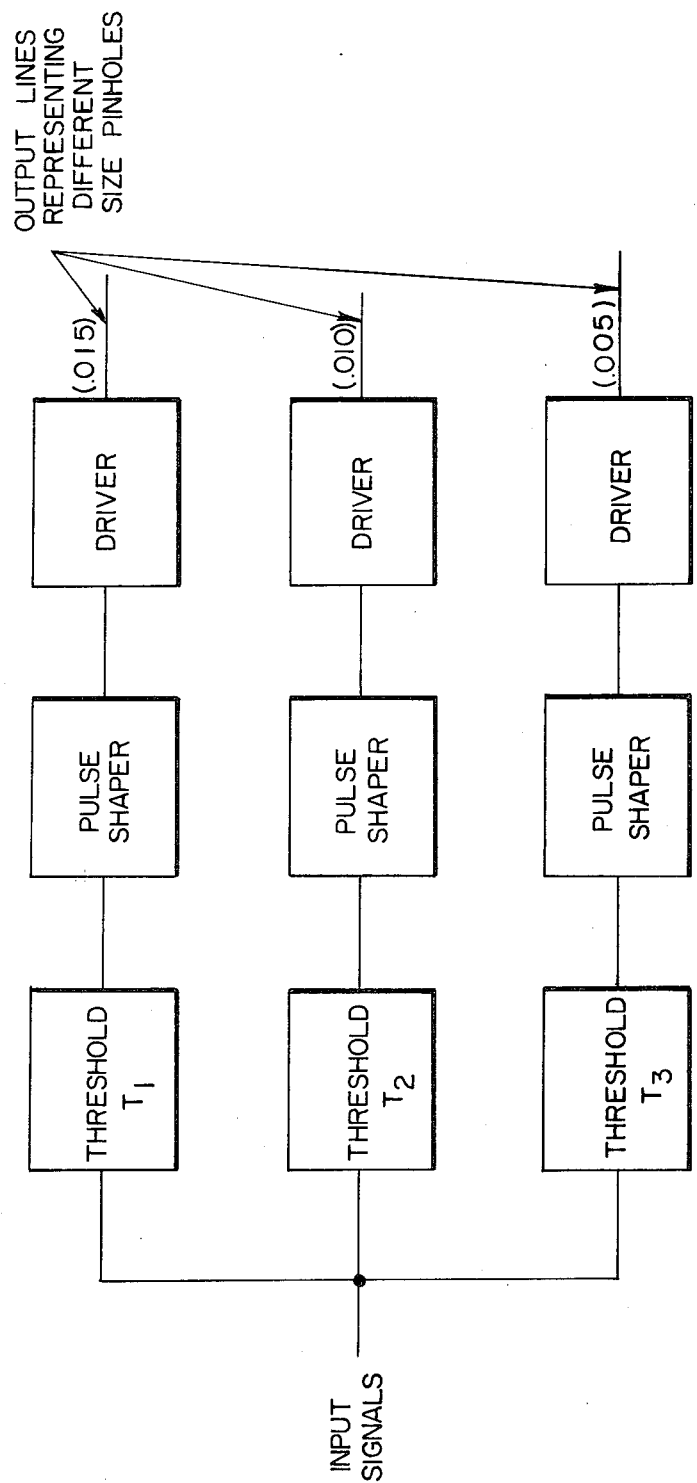
FIG. 3 is a schematic view of the pulse height analyzer yielding data for the number of pinholes exceeding a given size.
Figure 4:
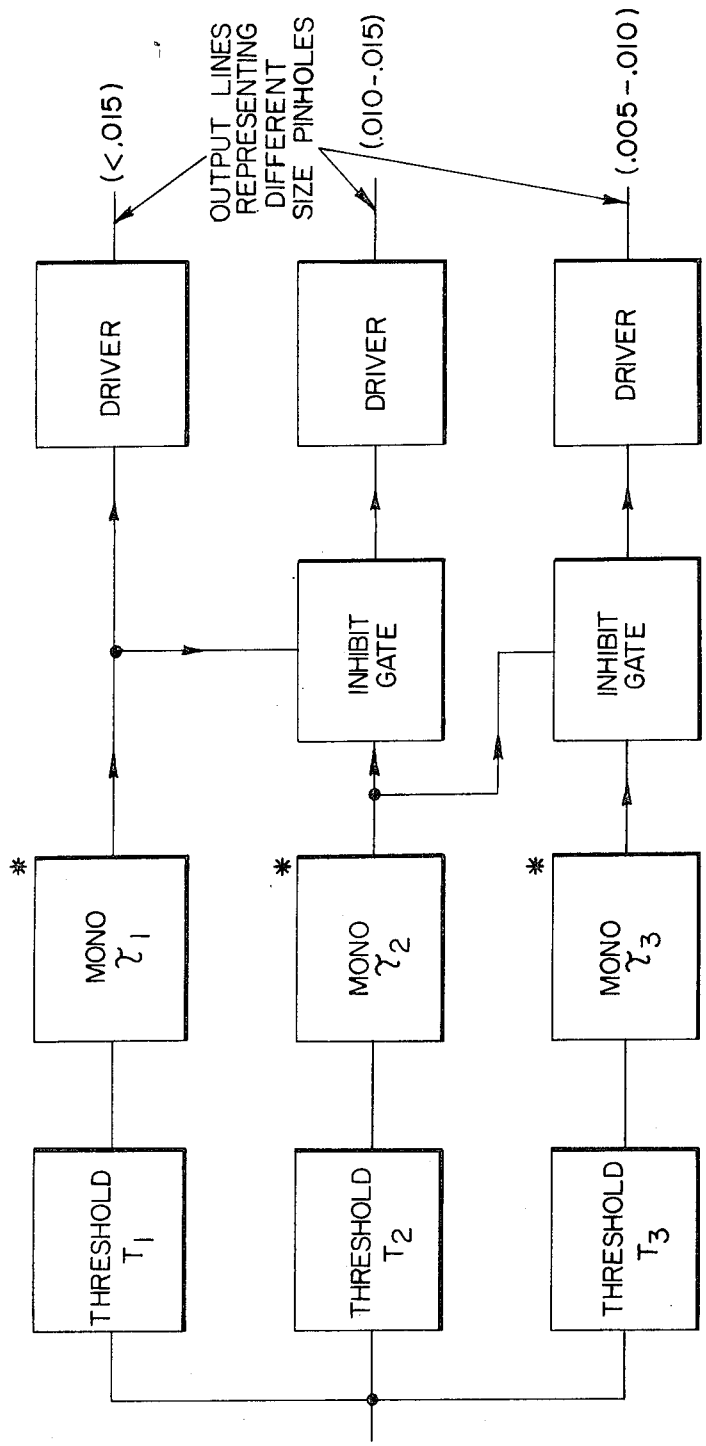
FIG. 4 is a circuit diagram of a pulse height analyzer yielding data for the number of pinholes in a give size group.

In the pulse height analyzer, the signal is fed into a bank of thresholds. Each threshold is a single ended differential amplifier which is biased "off" on one side. If the pulse amplitude is greater than the amount of threshold created by the biased "off" side of the differential amplifier, an output pulse will be obtained from that threshold. Therefore, for many pinholes outputs from more than one threshold may be expected. At least two different types of data may be desired from the system. If it is desired to know the number of pinholes greater than a given size, the outputs from the thresholds are fed through pulse shapers and drivers and directly into counters as shown in FIG. 3. If it is desired to know the number of pinholes in any given size range as a direct output (this can be calculated easily from the above) then the signal is passed through the circuitry shown in FIG. 4. In this case the threshold outputs are effectively delayed by using the trailing edge of the threshold output to trigger varying pulse width monostable multivibrators. (The output having the longest pulse width is that of the monostable multivibrator triggered by the highest threshold. The width of the pulse varies in direct relation to the amplitude of the threshold for all thresholds). With the arrangement shown in FIG. 4, the thresholds are arranged so that $T_1 > T_{2a} > T_3$ and the multivibrator pulse widths are arranged so that $\tau_1 > \tau_2 > \tau_3$. The monostable multivibrator outputs are used to inhibit an output on successively lower threshold lines. The pulse widths are selected so that there is a pulse only on the output line for the highest threshold that the signal crossed. Thus, one can immediately connect these pulses to separate counters and obtain direct data concerning the sizes of a pinhole.

The system can be calibrated either by the use of standard size holes or calibrated test lamps. In either case, the system can be periodically checked using light of the same frequency and spectrum as that of the light source.

We claim:

1. Method for detecting pinhole defects in foil material comprising:
   A. advancing said foil through a detecting plane;
   B. directing an ultra-violet light source onto a restricted portion of said plane; said ultra-violet light being modulated at a frequency substantially exceeding that of commercial light frequency;
   C. filtering out non-ultra-violet light from beneath said advancing foil;
   D. laterally shielding an area after said filtering and receiving the beam of light transmitted through pinhole defects through said area and into photosensitive means to obtain electrical pulses,
      i. amplifying said pulses;
      ii. advancing said pulses past a pulse height analyzer, the height of said pulses being measured as proportional to the dimensions of the pinhole defects;
      iii. diverting pulse signals with respect to a series of height thresholds, and counting the number of defects at each threshold for a certain length of advancing foil material.

2. Method for detecting pinhole defects in foil material as in claim 1, wherein said amplified electrical pulse is directed through an envelope detector, pulse shaper and driver means.

3. Method for detecting pinhole defects in foil material as in claim 1, wherein said photosensitive means are photomultiplier tubes.

4. Method for detecting pinhole defects in foil material as in claim 2, wherein said thresholds are representative of pinhole defects diameter.

5. Method for detecting pinhole defects in foil material as in claim 4, wherein said thresholds are respectively set to detect pinhole defects smaller than one of the following diameters: 0.005, 0.010 and 0.015.

6. Method for detecting pinhole defects in foil material as in claim 5, wherein detection is performed in a plurality of planes positioned around said advancing foil so as to sense defects in adjacent lineal portions of said foil.

7. System for detecting pinhole defects in foil material as in claim 5, including collimating ultra-violet light in a series of vertical channels such that said light strikes said foil material at right angles.

8. System for detecting pinhole defects in foil material as in claim 4, wherein said thresholds are respectively set to detect pinhole defects greater than the following diameters: 0.005, 0.010 and 0.015.

* * * * *